(12) United States Patent
Ohmoto et al.

(10) Patent No.: US 11,077,985 B2
(45) Date of Patent: Aug. 3, 2021

(54) MOUNTING BASE MEMBER, MOUNTING BASE, AND MOUNTING METHOD

(71) Applicants: OBAYASHI CORPORATION, Tokyo (JP); SRI INTERNATIONAL, Menlo Park, CA (US)

(72) Inventors: Eri Ohmoto, Tokyo (JP); Satoru Doi, Tokyo (JP); Tomoya Kaneko, Tokyo (JP); Koji Hamada, Tokyo (JP); Tamaki Horii, Tokyo (JP); Maya Kagatani, Tokyo (JP); Tatsuya Osugi, Tokyo (JP); Hiroto Sato, Redwood City, CA (US); Takashi Tsuchiya, Foster City, CA (US); Aveek Das, San Francisco, CA (US); Poojitha Preena, Piedmont, CA (US)

(73) Assignees: OBAYASHI CORPORATION, Tokyo (JP); SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 16/230,554

(22) Filed: Dec. 21, 2018

(65) Prior Publication Data
US 2020/0198834 A1     Jun. 25, 2020

(51) Int. Cl.
*B65D 19/00*     (2006.01)
*B65G 17/34*     (2006.01)

(52) U.S. Cl.
CPC ......... *B65D 19/0095* (2013.01); *B65G 17/34* (2013.01); *B65D 2519/00019* (2013.01);
(Continued)

(58) Field of Classification Search
CPC ...... B65D 19/0095; B65D 2519/00019; B65D 2519/00029; B65D 2519/00034; B65D 2519/00054; B65D 2519/00064; B65D 2519/00069; B65D 2519/00273; B65D 2519/00293; B65D 2519/00323; B65D 2519/00333; B65D 2519/00562;
(Continued)

(56) References Cited

U.S. PATENT DOCUMENTS 2,543,254 A * 2/1951 Osborn ..................... B62B 1/10
                                                                    414/446
2,691,499 A * 10/1954 Watts ................. B65D 19/0012
                                                                    108/51.3
(Continued)

FOREIGN PATENT DOCUMENTS

JP     2016-113283 A     6/2016

OTHER PUBLICATIONS

U.S. Office Action in U.S. Appl. No. 29/674,604 dated Apr. 30, 2020.

*Primary Examiner* — Daniel J Troy
*Assistant Examiner* — Timothy M Ayres
(74) *Attorney, Agent, or Firm* — Maschoff Brennan (57) ABSTRACT

Provided is a mounting base member used in a pair for mounting an object to be conveyed thereon, the mounting base member including: a body part configured to support the object to be conveyed; and a top plate part that extends in at least a horizontal direction from an upper part of the body part. The top plate part covers an upper surface of the body part, or the upper surface of the body part contacting the conveyed object is flush with an upper surface of an extending portion of the top plate part.

7 Claims, 7 Drawing Sheets

(52) U.S. Cl.
CPC ............ *B65D 2519/00029* (2013.01); *B65D 2519/00034* (2013.01); *B65D 2519/00054* (2013.01); *B65D 2519/00064* (2013.01); *B65D 2519/00069* (2013.01); *B65D 2519/00273* (2013.01); *B65D 2519/00293* (2013.01); *B65D 2519/00323* (2013.01); *B65D 2519/00333* (2013.01); *B65D 2519/00562* (2013.01); *B65D 2519/00567* (2013.01); *B65D 2519/00796* (2013.01)

(58) Field of Classification Search
CPC .......... B65D 2519/00567; B65D 2519/00796; B65G 17/34
USPC ...................................................... 108/52.1
See application file for complete search history.

(56) References Cited

U.S. PATENT DOCUMENTS

| | | | | |
|---|---|---|---|---|
| 3,424,364 A * | 1/1969 | Grafslund | ............... | B65D 19/20 206/340 |
| D220,442 S | 4/1971 | Beavers | | |
| 3,651,769 A * | 3/1972 | Foley | ................. | B65D 19/0073 108/56.1 |
| 3,880,286 A * | 4/1975 | Wegener | ................. | B65D 25/24 206/597 |
| 3,881,429 A * | 5/1975 | Seymore | ................. | B65D 19/20 108/51.3 |
| 3,902,692 A * | 9/1975 | Skinner | .............. | B65D 19/0095 248/346.02 |
| 4,051,786 A * | 10/1977 | Nordgren | ........... | B65D 19/0028 108/57.31 |
| 4,169,417 A * | 10/1979 | Gemvik | ................. | B65D 19/20 108/56.3 |
| 4,694,962 A * | 9/1987 | Taub | .................. | B65D 19/0073 108/185 |
| 5,237,936 A * | 8/1993 | Susel | ................. | B65D 19/0095 108/52.1 |
| 5,483,899 A * | 1/1996 | Christie | ............. | B65D 19/0073 108/56.3 |
| D414,628 S | 10/1999 | Gager et al. | | |
| D485,094 S | 1/2004 | Chang et al. | | |
| 7,025,208 B2 * | 4/2006 | Baker | ................. | B65D 19/0026 206/386 |
| D604,529 S | 11/2009 | Bloch et al. | | |
| 7,779,764 B2 * | 8/2010 | Naidu | ................. | B65D 19/0073 108/57.26 |
| 8,176,856 B2 * | 5/2012 | Dickner | ............... | B65D 19/385 108/55.5 |
| 8,667,905 B2 * | 3/2014 | Anderson | .......... | B65D 19/0095 108/51.11 |
| D711,171 S | 8/2014 | Brielmaier | | |
| 9,126,753 B2 * | 9/2015 | Cowie | .................... | B65D 90/16 |
| D740,595 S | 10/2015 | Kim et al. | | |
| D776,470 S | 1/2017 | Heck et al. | | |
| D786,594 S | 5/2017 | Yamamoto | | |
| D787,246 S | 5/2017 | Price et al. | | |
| D787,247 S | 5/2017 | Price et al. | | |
| D790,893 S | 7/2017 | Grossinger et al. | | |
| D794,686 S | 8/2017 | Kim et al. | | |
| 9,981,791 B2 * | 5/2018 | Feudner | ................. | B65D 19/38 |
| D846,313 S | 4/2019 | O'Gorman | | |
| D846,603 S | 4/2019 | Kwon et al. | | |
| D847,542 S | 5/2019 | Lipparini | | |
| D854,589 S | 7/2019 | Lee et al. | | |
| D859,892 S | 9/2019 | Tio et al. | | |
| D869,210 S | 12/2019 | Mangold | | |
| D873,056 S | 1/2020 | Stafford et al. | | |
| D874,193 S | 2/2020 | Goodman et al. | | |
| 2006/0065168 A1 * | 3/2006 | Chen | ................. | B65D 19/0026 108/51.3 |
| 2011/0132238 A1 * | 6/2011 | Jaegers | ............. | B65D 19/0026 108/55.1 |

* cited by examiner

MOUNTING BASE MEMBER, MOUNTING BASE, AND MOUNTING METHOD

BACKGROUND

1. Field

The present disclosure relates to a mounting base member, a mounting base, and a mounting method used for mounting an object to be conveyed.

2. Description of Related Art

Conventionally, materials such as woods at construction sites are mounted on palettes or sleepers to be prevented from being soiled or rotted. To convey the materials, conveyance apparatuses are used. For example, a conveyance apparatus described in Japanese Patent Application Laid-open No. 2016-113283 reloads materials or equipment mounted on sleepers onto a mounting surface thereof and moves to a destination along a magnetic tape.

However, when the materials or equipment mounted on the sleepers are loaded, conveyed to a conveyance destination, and unloaded onto sleepers at the conveyance destination, the sleepers are also required to be arranged at the conveyance destination, which takes time and effort. Further, when a forklift or the like is used to convey the materials or equipment, the materials or equipment may be mounted on pallets rather than on the sleepers and conveyed together with the pallets. In this case, the pallets are required to be withdrawn in the end. Therefore, the efficiency of conveying an object to be conveyed reduces.

SUMMARY

An embodiment of the present disclosure provides a mounting base member. The mounting base member is used in a pair for mounting an object to be conveyed thereon. The mounting base member includes: a body part configured to support the object to be conveyed; and a top plate part that extends in at least a horizontal direction from an upper part of the body part. The top plate part covers an upper surface of the body part, or the upper surface of the body part contacting the object to be conveyed is flush with an upper surface of an extending portion of the top plate part.

Another embodiment provides a mounting base. The mounting base includes: a pair of the mounting base members; and a connection part that connects the body parts of the mounting base members to each other such that an interval between the top plate parts of the mounting base members becomes a predetermined distance. The top plate part covers an upper surface of the body part, or the upper surface of the body part contacting the object to be conveyed is flush with an upper surface of an extending portion of the top plate part.

A still another embodiment provides a method for mounting an object to be conveyed using a pair of mounting base members, wherein the object to be conveyed is mounted on a mounting surface of a conveyance apparatus to be conveyed. Each of the mounting base members has a body part configured to support the object to be conveyed, and a top plate part that extends in at least a horizontal direction from an upper surface of the body part. The top plate part covers an upper surface of the body part, or the upper surface of the body part contacting the object to be conveyed is flush with an upper surface of an extending portion of the top plate part. The method includes: arranging the mounting base members such that the conveyance apparatus is positioned between the body parts, and such that the top plate parts are positioned above a lifting part of the conveyance apparatus.

Another embodiment provides a method for mounting an object to be conveyed using a pair of mounting base members. Each of the mounting base members has a body part configured to support the object to be conveyed, and a top plate part that extends in at least a horizontal direction from an upper surface of the body part. The top plate part covers an upper surface of the body part, or the upper surface of the body part contacting the object to be conveyed is flush with an upper surface of an extending portion of the top plate part. The method includes: arranging the mounting base members such that a pair of forks of a forklift is movable between a first position beneath the top plate parts and a second position between the top plate parts.

Other embodiments and advantages of the present disclosure will become apparent with reference to the following descriptions together with the accompanying drawings showing the principle of the present disclosure as examples.

BRIEF DESCRIPTION OF THE DRAWINGS

The present disclosure and its object and advantages will be best understood with reference to the following descriptions related to preferred embodiments at this point together with the accompanying drawings.

DETAILED DESCRIPTION

Hereinafter, a description will be given, with reference to FIGS. 1 to 4, of a first embodiment in which a mounting base member, a mounting base, and a mounting method using the mounting base members are embodied. In the first embodiment, a pair of mounting base members functions as a mounting base for mounting an object to be conveyed by a trolley thereon.

Figure 1:
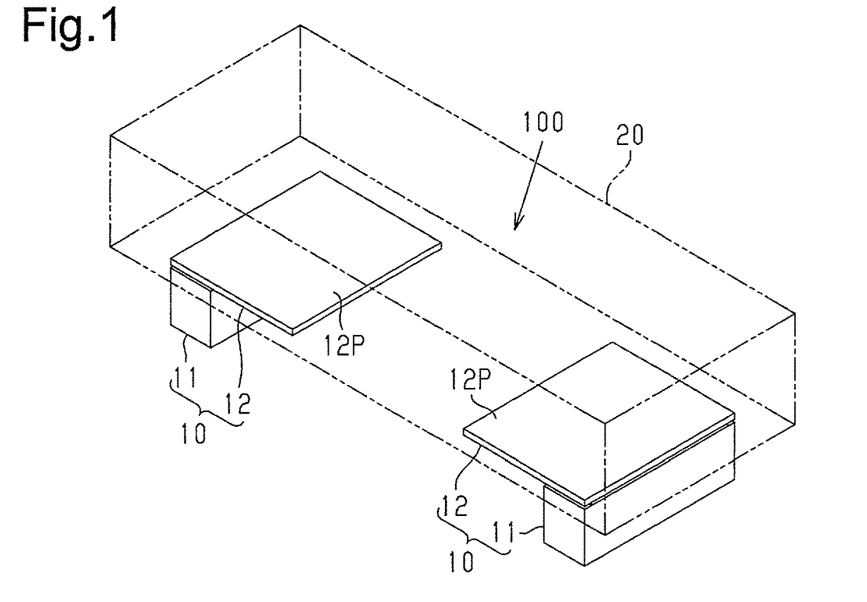
FIG. 1 is a perspective view showing mounting base members according to a first embodiment.

As shown in FIG. 1, a pair of (two) mounting base members 10 is arranged spaced apart from each other to form a mounting base 100.

Each of the mounting base members 10 is an elongated object including a body part 11 and a top plate part 12. In the first embodiment, the body part 11 has a length (a size in its longitudinal direction) of about 550 mm, a width of about 150 mm, and a height of about 185 mm. The top plate part 12 has a length substantially the same as that of the body part 11, a width of about 480 mm, and a thickness of about 1 mm. Note that the thickness of the top plate part 12 shown in FIG. 1 is exaggerated. The top plate part 12 is provided so as to cover the upper surface of the body part 11. In the first embodiment, the length of the body part 11 is substantially the same as that of the top plate part 12. The top plate part 12 is a rectangular plate member. The top plate part 12 includes a protrusion part 12P that protrudes in a horizontal direction from one end extending along its width direction of the body part 11. The pair of mounting base members 10 is arranged such that each of the protrusion parts 12P is directed towards another mounting base member 10 that makes a pair. The top plate part 12 is made of a metal plate having intensity for enabling to pull up the body part 11.

In addition, the position of an upper end in the height direction of the mounting base member 10 according to the first embodiment is higher than a position at which the mounting surface (lifting part) of a trolley for conveying an object to be conveyed thereon is lowered, and is lower than a position at which the mounting surface is raised (lifted up).

Figure 2A:
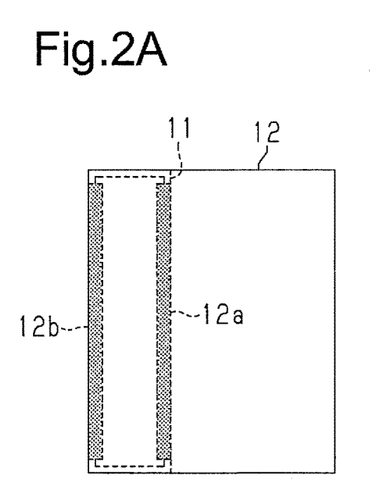
FIG. 2A is a top view of one of the mounting body members shown in FIG. 1.
Figure 2B:
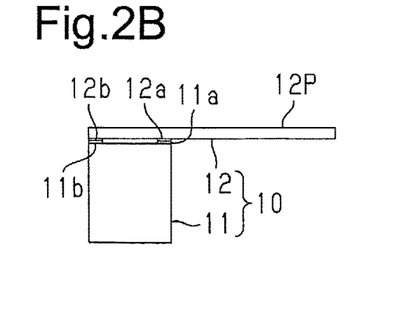
FIG. 2B is a front view of one of the mounting base members shown in FIG. 1.
Figure 2C:
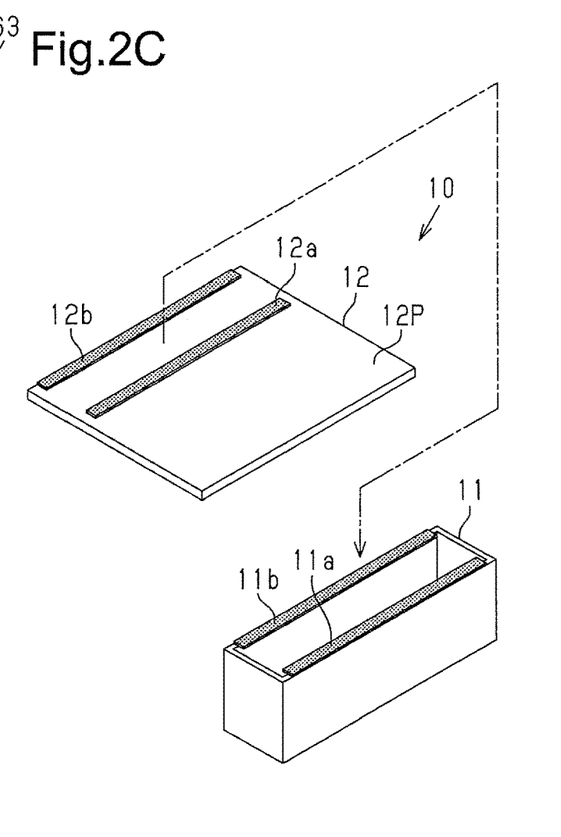
FIG. 2C is an exploded perspective view of one of the mounting base members shown in FIG. 1.

FIGS. 2A and 2B are a top view and a front view of the mounting base member 10, respectively. FIG. 2C is a view showing a state in which the mounting base member 10 has been divided into the body part 11 and the top plate part 12. In FIG. 2C, the top plate part 12 is inverted upside down for the purpose of illustration.

As shown in FIGS. 2A to 2C, the body part 11 has a square frame shape with a hollow part penetrating through in its vertical direction and is made of, for example, a synthetic resin such as Plapearl (registered trademark). On the upper surface of the body part 11, hook-and-loop fasteners 11a and 11b extending in its longitudinal direction are provided.

On the rear surface (lower surface) of the top plate part 12, two lines of hook-and-loop fasteners 12a and 12b spaced apart from each other and extending in its longitudinal direction are provided. The interval between the hook-and-loop fasteners 12a and 12b is the same as the interval between the hook-and-loop fasteners 11a and 11b provided on the body part 11. The hook-and-loop fasteners 12a and 12b provided on the rear surface of the top plate part 12 are attached onto the hook-and-loop fasteners 11a and 11b of the body part 11, respectively, to form the mounting base member 10.

Next, a description will be given, with reference to FIGS. 3A to 3D and FIG. 4, of an operation using the above mounting base members 10. A trolley T1 that conveys an object to be conveyed includes four mecanum wheels and is capable of moving in its right and left directions, backward and forward directions, and oblique directions and turning. In addition, the trolley T1 moves its mounting surface (upper surface) up and down to load or unload an object to be conveyed 20 (and the mounting base members 10).

Figure 3A:
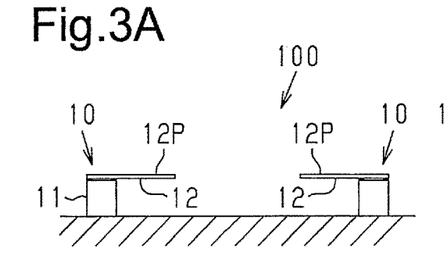
FIG. 3A is a view showing a state in which the mounting base members have been arranged.

As shown in FIG. 3A, the pair of (two) mounting base members 10 is arranged spaced apart from each other to form the mounting base 100 for mounting the object to be conveyed 20 thereon. In this case, the mounting base members 10 are arranged such that the interval between the body parts 11 of the mounting base members 10 becomes wider than the width of the trolley T1, and such that the interval between the top plate parts 12 (the protrusion parts 12P) becomes narrower than the width of the trolley T1. Thus, it is possible to make the trolley T1 enter and leave the place between the mounting base members 10 and mount the protrusion parts 12P on the trolley T1.

Figure 3B:
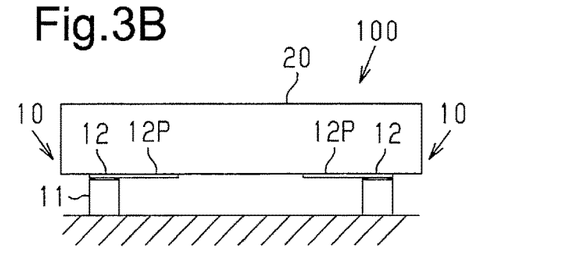
FIG. 3B is a view showing a state in which an object to be conveyed has been mounted on the mounting base members.

Next, as shown in FIG. 3B, the object to be conveyed 20 is mounted on the mounting base 100 such that the object to be conveyed 20 bridges the pair of mounting base members 10.

Figure 3C:
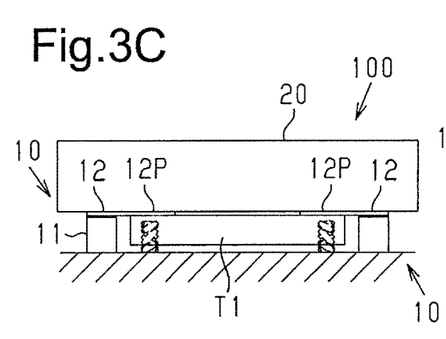
FIG. 3C is a view showing a state in which a trolley has reached the place between the mounting base members.

Then, as shown in FIG. 3C, the trolley T1 is between the mounting base members 10 with its mounting surface lowered to convey the object to be conveyed 20 arranged on the mounting base members 10. In this case, it is possible to place the trolley T1 between the mounting base members 10 since the interval between the body parts 11 of the mounting base members 10 is wider than the width of the trolley T1.

Figure 3D:
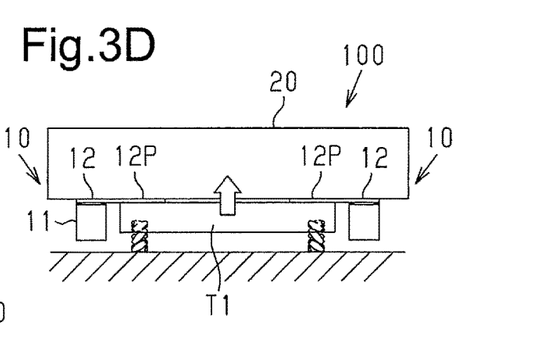
FIG. 3D is a view showing a state in which the trolley has lifted the mounting base members and the object to be conveyed.

Subsequently, as shown in FIG. 3D, the mounting surface of the trolley T1 is raised. In this case, the protrusion parts 12P are held between the mounting surface of the trolley T1 and the object to be conveyed 20, and the whole mounting base members 10 are lifted up as the mounting surface of the trolley T1 is raised. Thus, the trolley T1 lifts up the pair of mounting base members 10 together with the object to be conveyed 20 and conveys the mounting base members 10 and the object to be conveyed 20.

Figure 4:
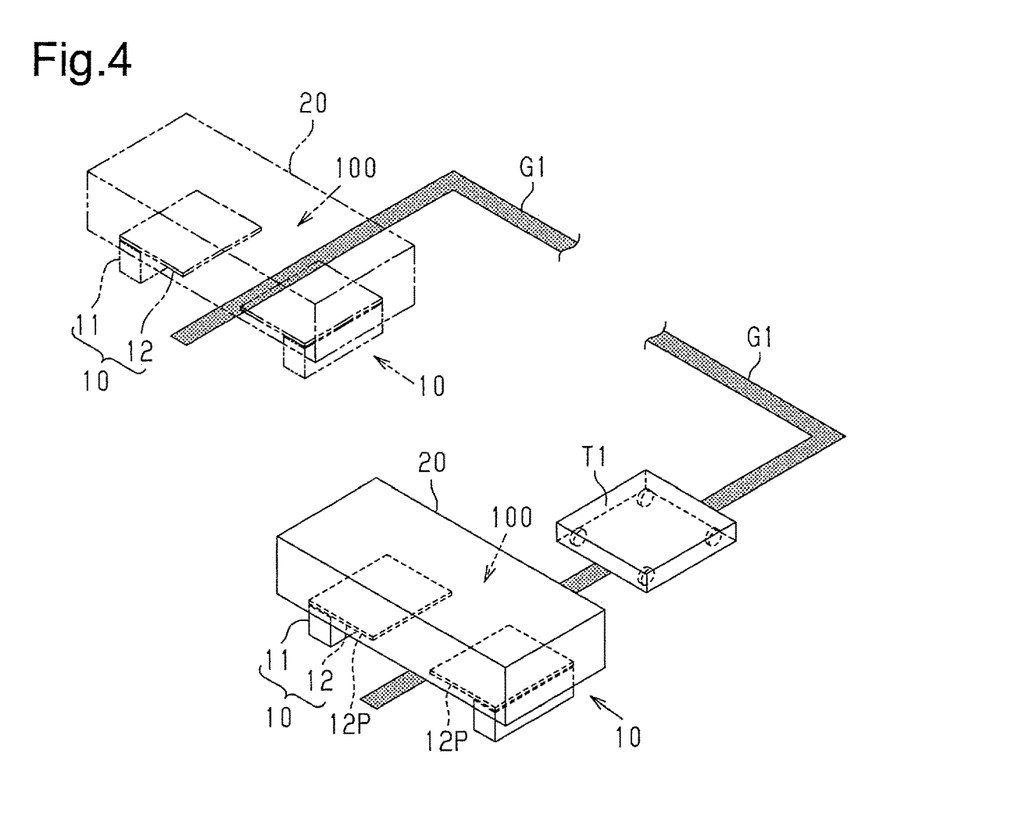
FIG. 4 is a view for describing a conveyance method using the mounting base members shown in FIG. 1 and the trolley.

As shown in FIG. 4, the trolley T1 moves to a conveyance destination while being guided by a magnetic tape G1 (along the magnetic tape G1) provided on a floor or the like in a construction site. In this case, the trolley T1 conveys the object to be conveyed 20 together with the mounting base members 10 on which the conveyed object 20 has been mounted. When reaching the conveyance destination, the trolley T1 lowers the mounting surface. In this case, when the mounting surface becomes lower than the upper ends in the height direction of the body parts 11, the mounting base members 10 are grounded and the object to be conveyed 20 are supported by the mounting base members 10.

According to the first embodiment, the following advantages may be obtained.

(1) In the first embodiment, each of the pair of mounting base members 10 includes the top plate part 12. Each of the top plate parts 12 includes the protrusion part 12P protruding from the upper surface of the body part 11 towards another mounting base member 10 that makes a pair. The object to be conveyed 20 is supported by and mounted on the body parts 11 of the mounting base members 10. In the conveyance of the object to be conveyed 20, the trolley T1 mounts the protrusion parts 12P thereon to make the object to be conveyed 20 conveyed in a state of being mounted on the mounting base members 10. Thus, setting up of a mounting base at a conveyance destination becomes unnecessary, and time and effort for performing a conveyance operation may be saved.

(2) In the first embodiment, the hook-and-loop fasteners 11a and 11b and the hook-and-loop fasteners 12a and 12b are provided on the body part 11 and the top plate part 12 of the mounting base member 10, respectively, so as to correspond to each other. Thus, the body part 11 and the top plate part 12 may be easily integrated with each other to form the mounting base member 10. The body part 11 may be separated from the top plate part 12 by peeling the hook-and-loop fasteners 11a and 11b away from the hook-and-loop fasteners 12a and 12b. Thus, if one of the body part 11 and the top plate part 12 is broken, only the broken one may be replaced with another to use the mounting base member 10. In addition, when a large number of the mounting base members 10 are conveyed, the efficiency of conveying the mounting base members 10 may be increased by disassembling the body parts 11 and the top plate parts 12 that are the constituents of the mounting base members 10.

(3) In the first embodiment, the body part 11 of the mounting base member 10 has a square frame shape with a hollow part defined in its center and is made of a synthetic resin. Thus, the weight of the object to be conveyed 20 conveyable by the trolley T1 may be further increased with a reduction in the weight of the mounting base members 10.

The first embodiment may be modified as follows to be performed. The first embodiment and the following modified examples may be combined with each other to be performed so long as any technological contradiction does not arise.

In the first embodiment, the top plate part 12 of the mounting base member 10 is made of a metal plate. However, the top plate part 12 is not necessarily made of a metal plate, and it may only be made of a material hardly bendable even when the trolley T1 lifts up the mounting base member 10, on which the object to be conveyed 20 has been mounted on only one of the mounting base member 10. In addition, the thickness of the top plate part 12 may be any thickness so long as the top plate part 12 has sufficient intensity when the trolley T1 lifts up the mounting base member 10. For example, the top plate part 12 may have a thickness of about ¼ to ¹⁄₁₀ of the thickness shown in FIG. 2B.

Further, the body part 11 of the mounting base member 10 is made of a synthetic resin. However, the body part 11 is not necessarily made of a synthetic resin. For example, wood, a corrugated cardboard material, or the like may be used so long as it is sufficiently resistant to a load from the above object to be conveyed 20 to support the object to be conveyed 20 and is light in weight.

In the mounting base member 10 according to the first embodiment, the body part 11 and the top plate part 12 are fixed to each other with hook-and-loop fasteners. The body part 11 and the top plate part 12 are not necessarily fixed to each other by hook-and-loop fasteners but may be fixed to each other by, for example, double-faced tapes. In addition, the body part 11 and the top plate part 12 are not necessarily fixed to each other with hook-and-loop fasteners so as to be detachable, but may be adhered to each other with adhesive, nails, or the like.

In the first embodiment, the top plate part 12 of the mounting base member 10 includes the protrusion part 12P protruding in one direction from the body part 11. However, the top plate part 12 may also protrude in a direction opposite to the protrusion part 12P from the body part 11. In this case, since the top plate part 12 protrudes in both directions from the body part 11, the mounting base member 10 may be stably arranged with the body part 11 keeping balance on both sides thereof.

In addition, as a configuration in which the mounting base member 10 is stably arranged, the top plate part 12 does not necessarily protrude from the body part 11 on its side opposite to the protrusion part 12P.

Figure 5:
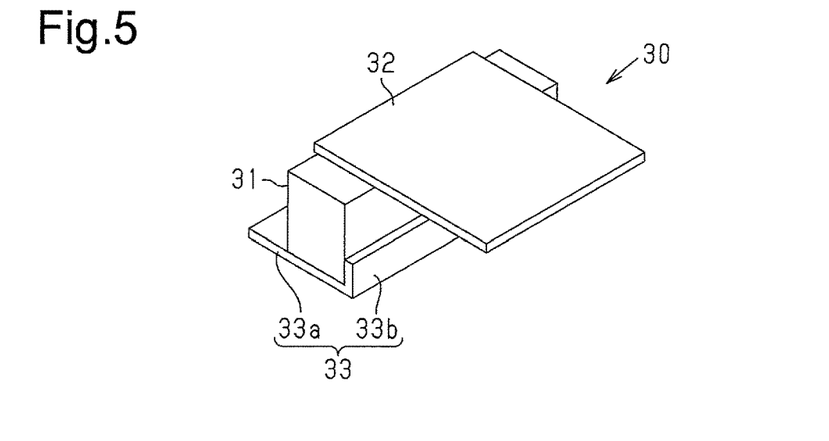
FIG. 5 is a perspective view showing a mounting base member according to a modified example.

For example, a mounting base member 30 may be used in which a body part 31, a top plate part 32, and a bottom surface part 33 are provided as shown in FIG. 5. Note that the length in the longitudinal direction of the body part 31 is greater than the length of the top plate part 32. The bottom surface part 33 of the mounting base member 30 may be integrally fixed to the body part 31 or separated from the body part 31. When the bottom surface part 33 of the mounting base member 30 is separated from the body part 31, only the bottom surface part 33 may be fixed in advance to a floor at a predetermined position. In this case, the mounting base member 10 conveyed together with the object to be conveyed 20 is mounted on the bottom surface part 33. Thus, the bottom surface part 33 may be used as a guide showing a place at which the mounting base member 30 is provided.

In the first embodiment, the pair of mounting base members 10 is arranged spaced apart from each other to form the mounting base 100. Instead of this, a pair of mounting base members that forms the mounting base 100 may be connected to each other at their bottom surface parts.

Figure 6A:
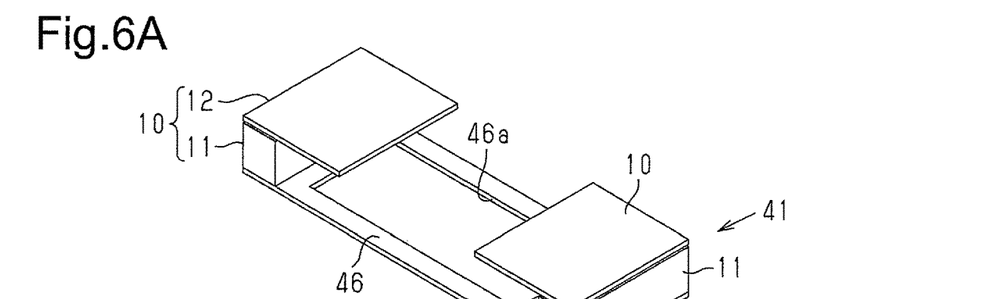
FIG. 6A is a perspective view showing a mounting base in which the mounting base members are connected to each other at their both ends according to a modified example.

As shown in FIG. 6A, a mounting base 41 includes the pair of mounting base members 10 and a connection part 46 that connects the pair of mounting base members 10 to each other. The connection part 46 is a plate-shaped member with a hole 46a defined in its center. The hole 46a is provided at a position and in a size so that all the wheels of the trolley T1 may be grounded when the trolley T1 carries the object to be conveyed 20. In addition, the body parts 11 of the respective mounting base members 10 are attached onto both ends of the connection part 46. Thus, the pair of mounting bases 41 may be arranged without the adjustment of the interval between the mounting bases 41.

Figure 6B:
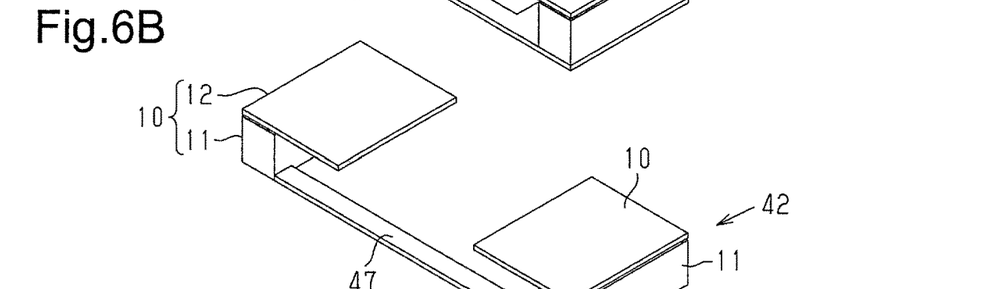
FIG. 6B is a perspective view showing a mounting base in which the mounting base members are connected to each other on their one sides according to a modified example.

In addition, as shown in FIG. 6B, a connection part 47 may connect the pair of (two) mounting base members 10 that forms a mounting base 42 to each other. The connection part 47 is connected to the respective body parts 11 at the end portions of the lateral surfaces extending in the longitudinal direction of the body parts 11 of the two mounting base members 10. In this case, the connection part 47 is not necessarily connected to the opposing lateral surfaces of the body parts 11 but may be arranged so as to cover the lateral surfaces on the same side extending in the longitudinal direction of the body parts 11.

Figure 6C:
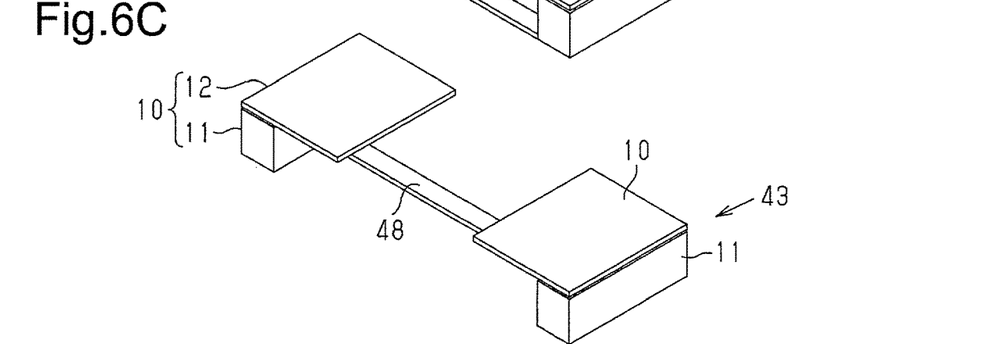
FIG. 6C is a perspective view showing a mounting base in which the mounting base members are connected to each other at their centers according to a modified example.

In addition, positions at which the two mounting base members 10 are connected to each other by a connection part are not limited to the end portions of body parts 11. For example, as shown in FIG. 6C, a connection part 48 may connect a mounting base 43 at the middle places in the longitudinal direction of the body parts 11. In this case, the connection part 48 is provided at a position at which the wheels of the trolley T1 passes through the connection part 48 when the trolley T1 carries the object to be conveyed 20.

In the first embodiment, the protrusion part 12P protrudes in the horizontal direction from the body part 11. However, the shape of the mounting base member is not limited so long as the mounting base member has a portion that horizontally extends from the body part 11 toward at least another mounting base member that makes a pair.

Figure 7A:
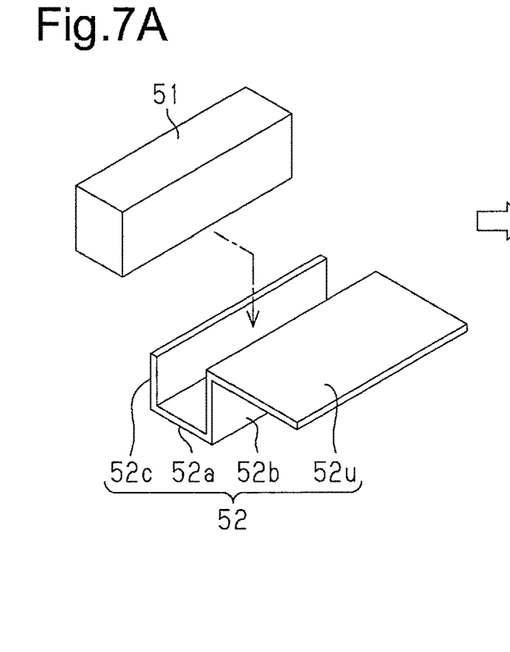
FIG. 7A is an exploded perspective view of a mounting base member according a modified example.
Figure 7B:
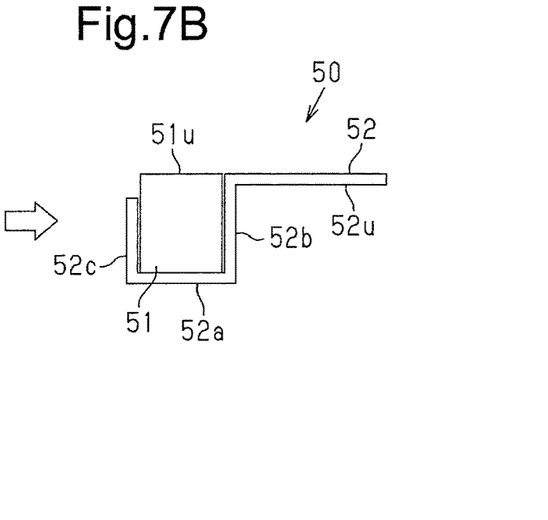
FIG. 7B is a front view of the mounting base member shown in FIG. 7A.

For example, a mounting base member 50 may have a shape shown in FIGS. 7A and 7B. The mounting base member 50 includes a body part 51 having a cuboid shape and a top plate part 52. The top plate part 52 includes an upper surface part 52u, a floor plate part 52a, a lateral surface part 52b, and a locking part 52c. The lateral surface part 52b connects the upper surface part 52u to the floor plate part 52a.

As shown in FIG. 7B, the lateral surface part 52b of the top plate part 52 has a height at which an upper surface part 51u of the body part 51 becomes flush with the upper surface part 52u of the top plate part 52 when the body part 51 is mounted on the floor plate part 52a.

Further, as shown in FIG. 7A, the size of the floor plate part 52a of the body part 51 is determined such that the lateral surface part 52b and the locking part 52c come in contact with the body part 51 when the body part 51 is mounted on the floor plate part 52a. Thus, only with the body part 51 mounted on the floor plate part 52a of the top plate part 52, the trolley T1 may load the body part 51 and the top plate part 52 in an integrated state. In addition, hook-and-loop fasteners may be omitted. Note that the top plate part 52 may not be provided with the locking part 52c.

In the first embodiment, the trolley T1 conveys the object to be conveyed 20 mounted on the mounting base members 10. However, a conveyance apparatus that conveys the object to be conveyed 20 is not limited to the trolley T1. For example, a forklift may convey the object to be conveyed 20. In this case, the adjustment of the interval between the forks of the forklift enables the forklift to convey only the object to be conveyed 20 with the mounting base members 10 left at its place or convey the mounting base members 10 together with the object to be conveyed 20.

Figure 8A:
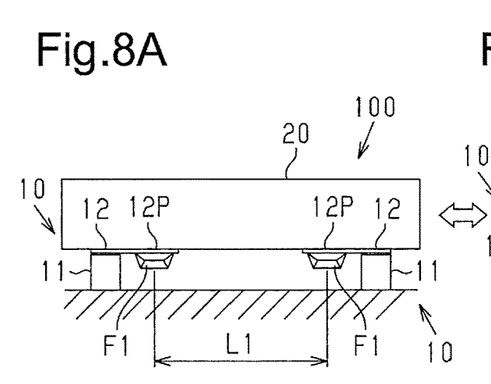
FIG. 8A is a view showing the mounting base members in a state in which the interval between the forks of a forklift has been widened according to a modified example.
Figure 8B:
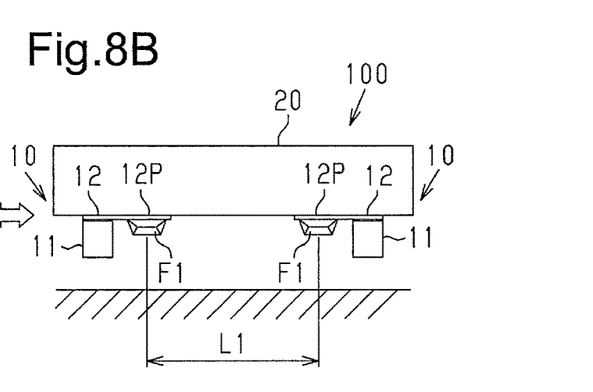
FIG. 8B is a view showing a state in which the mounting base members shown in FIG. 8A have been lifted up.

Specifically, as shown in FIG. 8A, the interval between a pair of forks F1 of a forklift is set at a wide interval L1 when the object to be conveyed 20 is conveyed together with the mounting base members 10. The interval L1 is narrower than the interval between the body parts 11 of the pair of mounting base members 10 and wider than the interval between the top plate parts 12 of the pair of mounting base members 10. As shown in FIG. 8B, the object to be conveyed 20 is conveyed together with the mounting base members 10 with the protrusion parts 12P mounted on the forks F1 with the forks F1 raised.

Figure 8C:
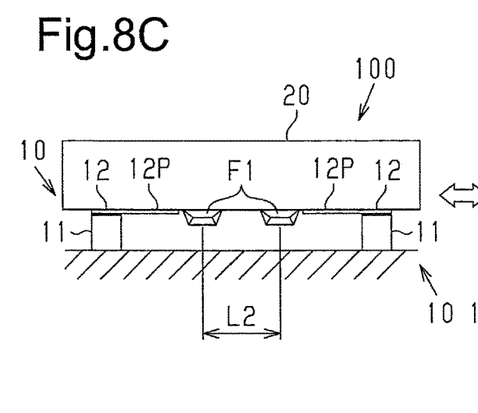
FIG. 8C is a view showing the mounting base members in a state in which the interval between the forks of the forklift has been narrowed according to a modified example.
Figure 8D:
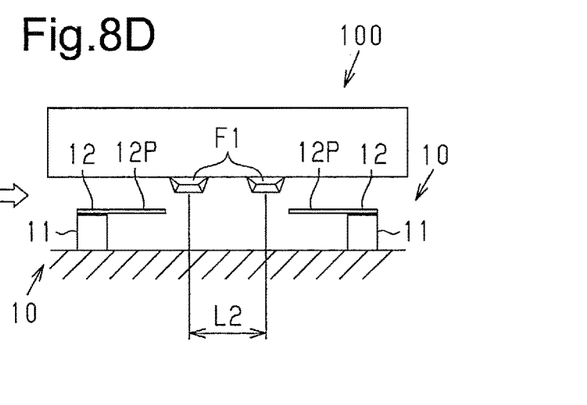
FIG. 8D is a view showing a state in which the mounting base members shown in FIG. 8C have been lifted up.

Further, as shown in FIG. 8C, the interval between the pair of forks F1 of the forklift is set at an interval L2 narrower than the interval L1 when only the object to be conveyed 20 is conveyed separately from the mounting base members 10. The interval L2 is a width which means that the forks F1 are positioned between the protrusion parts 12P of the top plate parts 12 of the pair of the mounting base members 10. As shown in FIG. 8D, only the object to be conveyed 20 is mounted on the forks F1 with the mounting base members 10 left at their places when the forks F1 are raised.

In the first embodiment, the two mounting base members 10 are used in a pair. The number of the mounting base members 10 that forms a set of the mounting bases 100 is not limited to two but may be three or more.

Figure 9A:
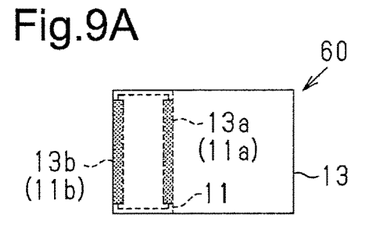
FIG. 9A is a top view of a mounting base member according to a modified example in which a top plate part has an aspect ratio different from that of the top plate part according to the first embodiment.
Figure 9B:
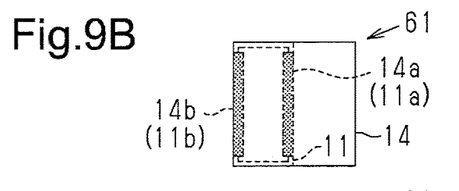
FIG. 9B is a top view of a mounting base member according to a modified example in which a top plate part has an aspect ratio different from that of the top plate part according to the first embodiment.
Figure 9C:
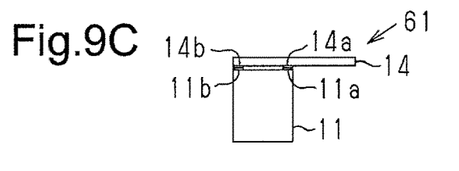
FIG. 9C is a front view of the mounting base member shown in FIG. 9B.
Figure 10A:
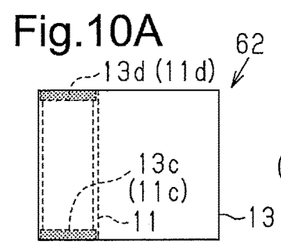
FIG. 10A is a top view of a mounting base member according to a modified example.
Figure 10B:
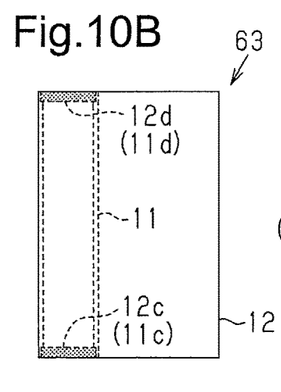
FIG. 10B is a top view of a mounting base member according to a modified example.
Figure 10C:
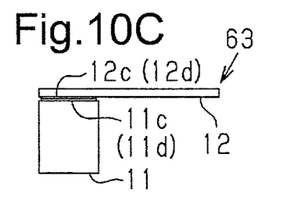
FIG. 10C is a front view of the mounting base member shown in FIG. 10B.
Figure 10D:
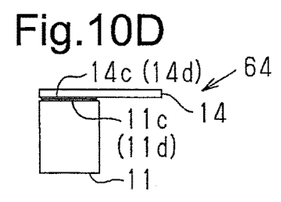
FIG. 10D is a front view of a mounting base member according to a modified example.
Figure 10E:
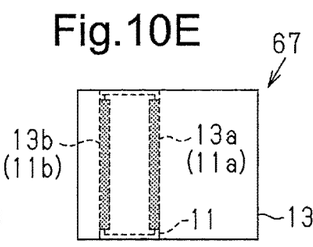
FIG. 10E is a top view of a mounting base member according to a modified example.
Figure 10F:
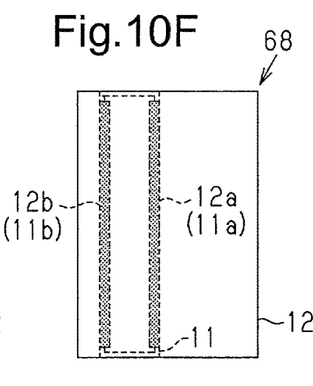
FIG. 10F is a top view of a mounting base member according to a modified example.
Figure 10G:
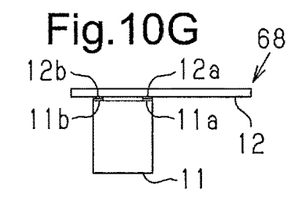
FIG. 10G is a front view of the mounting base member shown in FIG. 10F.
Figure 10H:
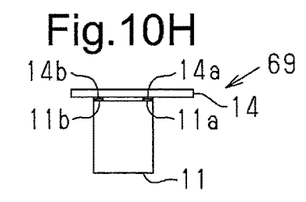
FIG. 10H is a front view of a mounting base member according to a modified example.
Figure 10I:
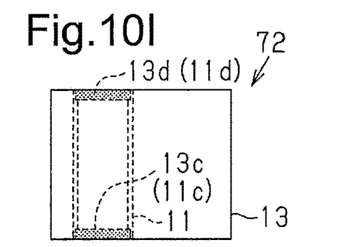
FIG. 10I is a top view of a mounting base member according to a modified example.
Figure 10J:
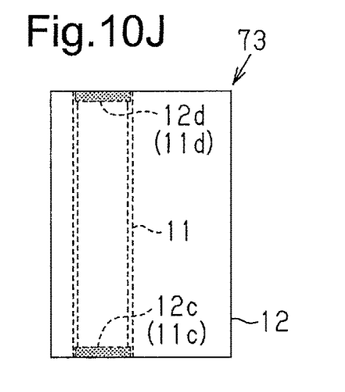
FIG. 10J is a top view of a mounting base member according to a modified example.
Figure 10K:
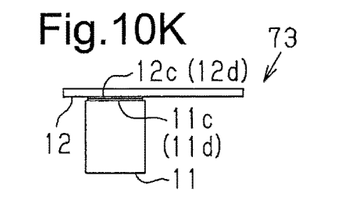
FIG. 10K is a front view of the mounting base member shown in FIG. 10J.
Figure 10L:
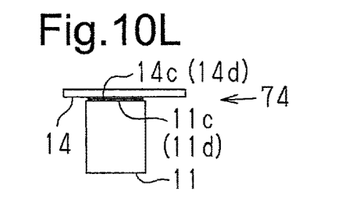
FIG. 10L is a front view of a mounting base member according to a modified example.

The mounting base member 10 of the first embodiment includes the top plate parts 12 having a cuboid shape in which a first size (length) in the longitudinal direction of the body part 11 is greater than a second size (width) in the short-side direction thereof orthogonal to the longitudinal direction. However, the top plate part may have another shape. For example, as shown in FIG. 9A, a mounting base member 60 may include a top plate part 13 smaller in size in its longitudinal direction than the top plate part 12. In addition, as shown in FIGS. 9B and 9C, a mounting base member 61 may include a top plate part 14 smaller in length and width with relative to the body part 11 than the top plate parts 12 and 13. Like the top plate part 12, hook-and-loop fasteners 13a and 13b and 14a and 14b are also provided on the top plate parts 13 and 14, respectively, corresponding to the hook-and-loop fasteners 11a and 11b on the upper surfaces of the body parts 11. The body parts 11 are fixed to the top plate parts 13 and 14 by the hook-and-loop fasteners 11a, 11b, 13a, 13b, 14a, and 14b.

In addition, the positions, the ranges, and the quantities of adhesive members such as hook-and-loop fasteners are arbitrarily so long as the adhesive members are capable of fixing a body part to a top plate part. For example, as shown in FIGS. 10A to 10D, hook-and-loop fasteners 11c and 11d may be provided so as to extend in the short-side direction of the body parts 11. Mounting base members 62, 63, and 64 may be used in which hook-and-loop fasteners 12c, 13c, and 14c and hook-and-loop fasteners 12d, 13d, and 14d corresponding to the hook-and-loop fasteners 11c and 11d are provided on the top plate parts 12, 13, and 14, respectively. In addition, as shown in FIGS. 10E to 10L, mounting base members 67, 68, 69, 72, 73, and 74 may be used in which hook-and-loop fasteners 12a, 13a, 14a, 12c, 13c, and 14c and hook-and-loop fasteners 12b, 13b, 14b, 12d, 13d, and 14d are provided on the inner side of the outer ends of the top plate parts 12, 13, and 14, respectively.

Figure 11A:
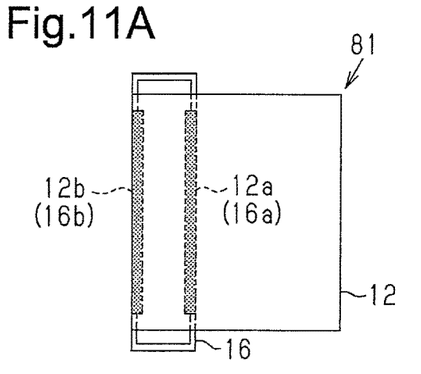
FIGS. 11A to 11H are top views each showing a mounting base member according to a modified example.
Figure 11B:
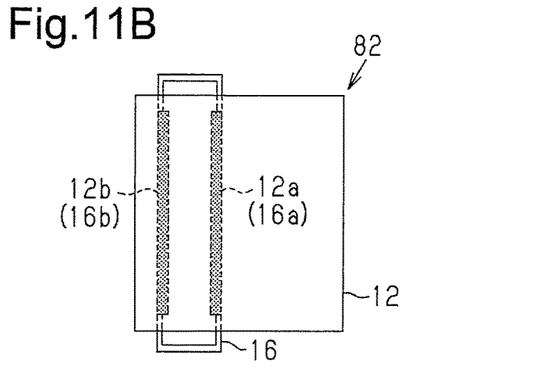
Figure 11C:
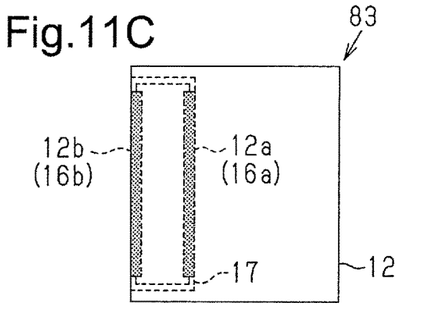
Figure 11D:
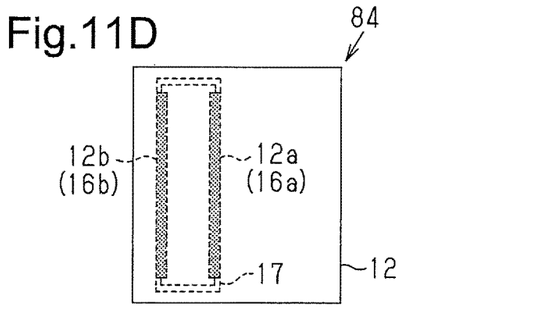
Figure 11E:
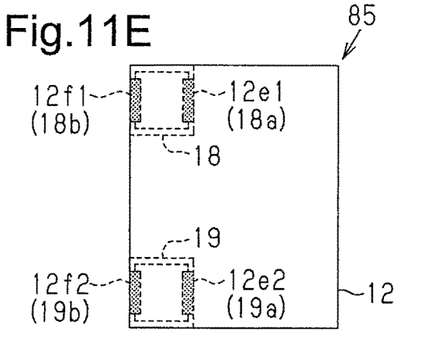
Figure 11F:
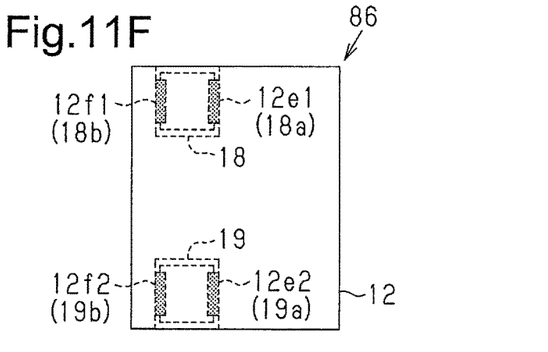
Figure 11G:
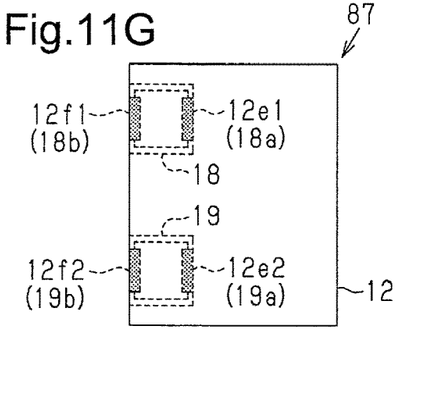
Figure 11H:
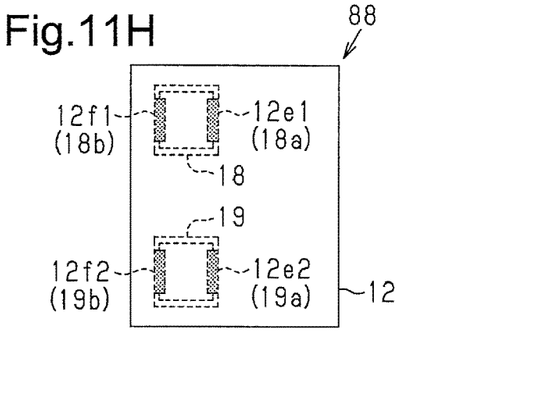

The mounting base member 10 according to the first embodiment uses the top plate part 12 having substantially the same length as that of the body part 11. However, the lengths of a body part and a top plate part may not be substantially the same. Specifically, as shown in FIGS. 11A and 11B, mounting base members 81 and 82 may be used in which a body part 16 has a length protruding from the top plate part 12. In addition, as shown in FIGS. 11C and 11D, mounting base members 83 and 84 may be used in which the top plate part 12 has a length greater than that of a body part 17. In these cases, hook-and-loop fasteners 16a and 17a (16b and 17b) of the body parts 16 are provided at positions corresponding to the hook-and-loop fasteners 12a and 12b of the top plate parts 12, respectively.

In addition, the body part may be divided into a plurality of pieces. As shown in FIGS. 11E to 11H, mounting base members 85, 86, 87, and 88 may be used in which the top plate part 12 is provided on the upper surfaces of a plurality of body parts 18 and 19 and the object to be conveyed 20 (and the top plate part 12) are supported by the plurality of body parts 18 and 19. In this case, the body parts 18 and 19 have a cuboid shape with a hollow part penetrating through in their vertical direction. Hook-and-loop fasteners 12f1, 12e1, 12f2, and 12e2 of the top plate part 12 are provided at positions corresponding to hook-and-loop fasteners 18a, 18b, 19a, and 19b of the body parts 18 and 19, respectively. Note that the top plate part 12 in FIGS. 11A to 11H may be modified as shown in FIGS. 9A to 9C and FIGS. 10A to 10L.

Figure 12A:
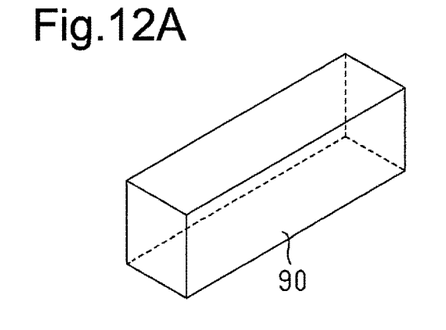
FIGS. 12A to 12G are perspective views each showing a mounting base member according to a modified example.
Figure 12B:
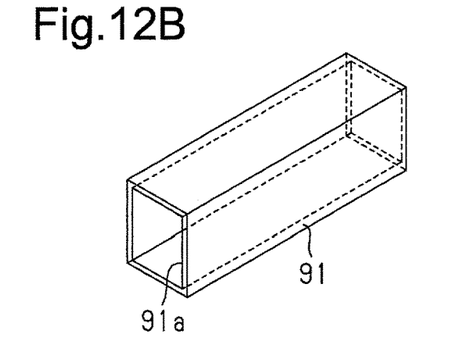
Figure 12C:
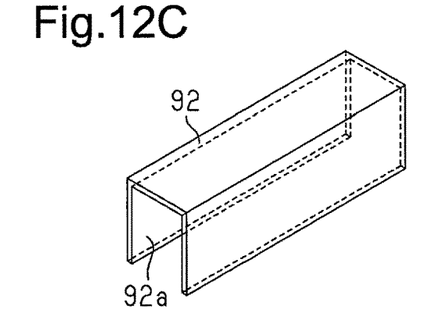
Figure 12D:
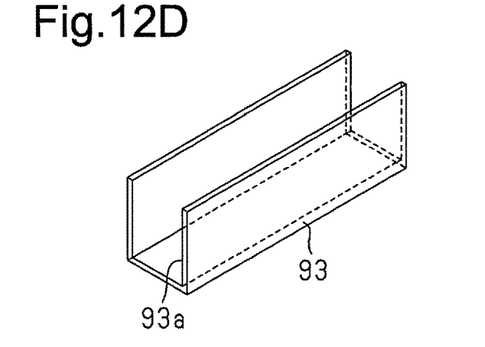

The body part 11 of the mounting base member 10 according to the first embodiment has a square frame shape with a hollow part penetrating through in its vertical direction. However, the body part 11 may have another shape. For example, solid body parts 51 and 90 as shown in FIGS. 7A and 12A may be used. Further, a body part 91 with a hollow part 91a penetrating through in the longitudinal direction (horizontal direction) of the body part 11 as shown in FIG. 12B may be used. Further, a body part 92 with a channel part 92a extending through in the horizontal direction of the body part 11 and opened downward as shown in FIG. 12C may be used. In addition, as shown in FIG. 12D, a body part 93 with a channel part 93a obtained by inverting the body part 92 in FIG. 12C upside down may be used.

Figure 12E:
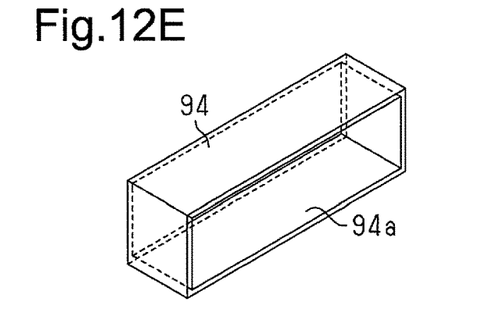
Figure 12F:
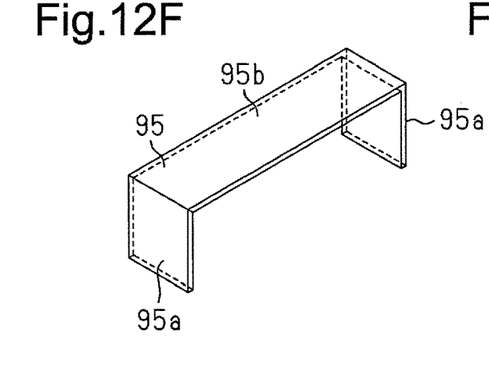
Figure 12G:
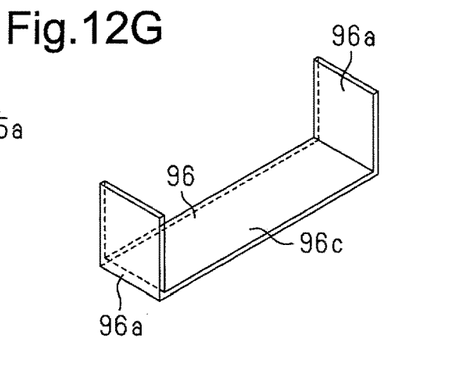

Further, a body part 94 with a hollow part 94a penetrating through in the short-side direction (horizontal direction) of the body part 11 as shown in FIG. 12E may be used. Further, a body part 95 including two lateral surfaces 95a and an upper surface 95b as shown in FIG. 12F may be used. Further, a body part 96 including two lateral surfaces 96a and a bottom surface 96b as shown in FIG. 12G may be used. In addition, a body part having a shape in which the structures of the body parts 90 to 96 as shown in FIG. 12A to 12G are separated into a plurality of pieces may be used. When the body parts are separated into a plurality of pieces, the shape of the respective separated pieces is not limited to a prism but may be a cylinder, a triangular prism, or a polygonal pillar of five or more angles. Further, the respective portions may be hollow bodies or solid bodies.

What is claimed is:

1. A mounting base member used in a pair for mounting an object to be conveyed thereon, the mounting base member comprising:
   a body part configured to support the object to be conveyed; and
   a top plate part that includes a bottom surface, a first lateral surface part, a second lateral surface part opposite to the first lateral surface part in a first direction, and an extending portion that horizontally extends in the first direction from an upper part of the first lateral surface part,
   wherein:
   a first height is defined between a lower end and an upper end of the first lateral surface part,
   a second height is defined between a lower end and an upper end of the second lateral surface,
   the second height is less than the first height,
   the upper ends of the first and second lateral surface parts are not coplanar while the lower ends of the first and second lateral surface parts are on a plane at which the bottom surface contacts the body part, and
   an upper surface of the body part contacting the object to be conveyed is flush with an upper surface of the extending portion.

2. The mounting base member according to claim 1, wherein an upper surface of the second lateral surface part is not flush with the upper surface of the body part.

3. The mounting base member according to claim 1, wherein the extending portion extends from the first lateral surface part in a direction opposite to the second lateral surface part.

4. The mounting base member according to claim 1, wherein the top plate part has a hollow part that horizontally penetrates the top plate part in a direction parallel to the first lateral surface part and the second lateral surface part.

5. The mounting base member according to claim 1, wherein the first lateral surface part and the second lateral surface part are vertical.

6. A method for mounting an object to be conveyed using a pair of mounting base members, the object to be conveyed being mounted on a mounting surface of a conveyance apparatus and being conveyed, each of the mounting base members having:
   a body part configured to support the object to be conveyed; and
   a top plate part that includes a bottom surface, a first lateral surface part, a second lateral surface part opposite to the first lateral surface part in a first direction, and an extending portion that horizontally extends in the first direction from an upper part of the first lateral surface part,
   wherein:
   a first height is defined between a lower end and an upper end of the first lateral surface part,
   a second height is defined between a lower end and an upper end of the second lateral surface,
   the second height is less than the first height,
   the upper ends of the first and second lateral surface parts are not coplanar while the lower ends of the first and second lateral surface parts are on a plane at which the bottom surface contacts the body part, and an upper surface of the body part contacting the object to be conveyed is flush with an upper surface of the extending portion, the method comprising:

arranging the mounting base members such that the conveyance apparatus is positioned between the body parts, and such that the top plate parts are positioned above a lifting part of the conveyance apparatus.

7. A method for mounting an object to be conveyed using a pair of mounting base members, each of the mounting base members having:

a body part configured to support the object to be conveyed; and a top plate part that includes a bottom surface, a first lateral surface part, a second lateral surface part opposite to the first lateral surface part in a first direction, and an extending portion that horizontally extends in the first direction from an upper part of the first lateral surface part, wherein:

a first height is defined between a lower end and an upper end of the first lateral surface part, a second height is defined between a lower end and an upper end of the second lateral surface, the second height is less than the first height, the upper ends of the first and second lateral surface parts are not coplanar while the lower ends of the first and second lateral surface parts are on a plane at which the bottom surface contacts the body part, and an upper surface of the body part contacting the object to be conveyed is flush with an upper surface of the extending portion, the method comprising:

arranging the mounting base members such that a pair of forks of a forklift is movable between a first position beneath the top plate parts and a second position between the top plate parts.

* * * * *